United States Patent [19]

Bertholds et al.

[11] Patent Number: 5,451,737
[45] Date of Patent: Sep. 19, 1995

[54] METHOD AND APPARATUS FOR ELECTRO-DISCHARGE WIRE CUTTING

[75] Inventors: Axel Bertholds, Cavigliano; Andreas Braunschweiler, Brissago; Attilio Lodetti, Losone, all of Switzerland

[73] Assignee: AG Für industrielle Elektronik, Losone bei Locarno, Switzerland

[21] Appl. No.: 111,140

[22] Filed: Aug. 24, 1993

[30] Foreign Application Priority Data

Aug. 26, 1992 [DE] Germany ............... 42 28 329.9

[51] Int. Cl.⁶ ............... B23H 7/10; B23H 7/20
[52] U.S. Cl. ................................. 219/69.12
[58] Field of Search ................. 219/69.12

[56] References Cited

U.S. PATENT DOCUMENTS

| | | | |
|---|---|---|---|
| 4,232,208 | 11/1980 | Bhhler | 219/69.12 |
| 4,364,812 | 12/1982 | Inoue | 219/69.12 |
| 4,638,140 | 1/1987 | Obara et al. | 219/69.12 |
| 4,673,788 | 6/1987 | Buchler | 219/69.12 |
| 4,829,151 | 5/1989 | Büchler | 219/69.12 |
| 5,006,691 | 4/1991 | Nakayama | 219/69.12 |
| 5,162,630 | 11/1992 | Iwasaki | 219/69.12 |

FOREIGN PATENT DOCUMENTS

| | | | |
|---|---|---|---|
| 58-126025 | 7/1983 | Japan | 219/69.12 |
| 60-62420 | 4/1985 | Japan | 219/69.12 |

*Primary Examiner*—Geoffrey S. Evans
*Attorney, Agent, or Firm*—Cohen, Pontani, Lieberman, Pavane

[57] ABSTRACT

The wire electrode advances upstream of the workpiece by a torus shaped wire guide with a position sensor to monitor the position of the wire electrode. Additional open v-grooved wire guides may also be present.

9 Claims, 6 Drawing Sheets

METHOD AND APPARATUS FOR ELECTRO-DISCHARGE WIRE CUTTING

BACKGROUND OF THE INVENTION

The present invention concerns apparatus for electro-erosive cutting. A cathode in the form of a wire advances through at least one wire guide, with one guide being upstream and the other, if any, downstream of the workpiece in terms of the direction advanced by the wire. The invention also concerns a method of electro-erosive cutting that uses such apparatus.

Many types of apparatus, machinery, and systems for and of methods of electro-erosive cutting are known. The basic apparatus usually comprises a stand with transmissions and wiring, a flushing system, a generator, and numerical or computerized numerical controls. A cathode in the form of a wire cuts a blank out of the work, which constitutes the anode, starting with an already drilled bore or opening or reference point.

At the cut, the cutting speed and tension on the wire are prescribed and regulated. The aforesaid wire guide or guides ensure that the wire is at least extensively precisely positioned. The guides are usually accommodated in what are called wire-guide heads.

There is in the field of electro-erosive cutting a particular need for wire guides that can be used to cut at a conical angle to the vertical. This need applies especially to wire guides accommodated in stationary heads. Definite limitations have been demonstrated for cutting at angles of 0° to 45°. Although the problem is not as serious with rotating wireguide heads, such rotating heads are more expensive.

SUMMARY OF THE INVENTION

One object of the present invention is an advanced apparatus for electro-erosive cutting that will not have the aforesaid limitations. Another object is a method employing the apparatus.

The first object is attained in accordance with the invention in that at least one wire guide is a closed wire guide, a guide that surrounds the wire, that is, the wire-position sensor is accommodated in the apparatus where it can monitor the position of the wire in the guide. The wire-position sensor will allow high-precision cutting even when the wire guides are low-precision.

The object is also attained in accordance with the invention as recited in Claim 7 (and in an alternative version of Claim 8). One wire-position sensor is accordingly employed in the vicinity of the workpiece.

Wire-position sensors are known. They are for example manufactured by AGIE (Aktiengesellschaft für Industrielle Elektronik). In conjunction with appropriate hardware and software they make it possible to guide the wire precisely, allowing very accurate corners to be cut very rapidly. Sensors of this type are described for example in European Patent 0 312 056. The wire guides in state-of-the-art models are open wire guides, guides with notches that do not enclose the wire, that is. It makes considerable sense, however, to employ such sensors in conjunction with guides that enclose the wire because the sensors can be accommodated where they can monitor the position of the wire in the guides. This solves a problem that is typically encountered with closed wire guides. Specifically, the state-of-the-art closed guides must surround the wire as snugly as possible. When the wire is too thin in relation to the opening through the center of the torus, it is impossible to know exactly where it is inside the guide. It is accordingly necessary to replace the guide in order to use a thicker or thinner wire. The present invention eliminates this necessity.

Another advantage of the present invention is that the wire-position sensor can to a large part be employed with existing or only slightly modified software.

Since the wire-position sensor monitors the position of the wire in the guide, it becomes possible to use wire guides, toruses for example, that do not surround the wire as snugly.

The sensor or at least one of the sensors in one especially preferred embodiment of the invention is accommodated near the closed wire guide or guides. "Near" means where the sensor can monitor the position of the wire in the open wire guide directly, without having to compensate for bulging on the pan of the wire. A wire-position sensor is usually employed to detect the bulge while a blank is being cut out of the workpiece. The result of the detection, which can optionally be conducted in the vicinity of the workpiece, can be exploited to calculate the position of the wire in the workpiece.

If the wire-position sensor is very remote from the torus, it is of course still possible to monitor the position of the wire with a certain amount of accuracy even when the precise position of the wire in the torus is unknown. Particular precision, however, can be obtained by also detecting the precise position of the wire in the torus because the position of the wire in the torus (on one or both sides of the workpiece) is a reference point for calculating the position of the wire in the workpiece. When the wire-position sensor is nearer the torus (and when it has an extensive enough sensing surface), it is even possible to obtain precise enough results with just one wire-position sensor.

The results can, however, be even more precise when more wire-position sensors are employed. When, for example, there is a torus on each side of the workpiece and demands for precision are particularly high, a wire-position sensor can also be positioned on each side of the workpiece.

One advanced version of the invention is characterized by a wire threader, especially a wire threader with a water jet. It has previously been extremely difficult if not impossible to employ a water-jet wire threader with a closed wire guide. One major advantage of an open wire guide, a guide that accommodates without surrounding the wire, over a closed wire guide is that it can accommodate wires of any diameter without requiring replacement of the head. Conventional closed wire guides on the other hand must fit the wire as snugly as possible to ensure precision.

Up-to-date electro-erosive cutting apparatus employs an at least semiautomatic wire threader that propels the wire from one wire-guide head to the other through a starting bore drilled through the workpiece. It is possible to thread a wire through a closed wire guide with a high-pressure jet of water, which surrounds the wire. The jet entrains the unrolling wire from one wire-guide head to the other through the starting bore.

It has previously been impossible to direct a jet of water through closed wire guides (which can have diameters ranging from 0.02 to 0.33 mm depending on how thick the wire is), and other threading systems have necessarily been employed.

Heating the wire, pulling it in two, and threading it while moving the upper wire-guide head in the Z direction and pumping water from the lower head is known for example.

Another alternative is to cut the wire in two and thread it from one head to the other by external means.

The thread can also be threaded from the upper to the lower head through a tube.

These approaches are, with the exception of the water-jet procedure, highly complicated, and the present invention also constitutes an improvement from this aspect. It now becomes possible to employ a water-jet wire threader with closed wire guides. The opening through the center of the torus can, when a wire-position sensor is employed, be wide enough for a jet to entrain the wire directly through it.

Another advantage of the aforesaid water-jet wire threader is that it can be employed with closed wire guides of the type manufactured by AGIE and accordingly known without any components aside from the appropriately designed wire-guide heads. Nor does it require special wire handling. Furthermore, it is extremely reliable.

The opening through the center of the closed wire guide in another preferred embodiment of the invention can be at least twice as wide as the wire. It is particularly practical for the opening to be approximately 10 times as wide as the wire is thick. The opening through the center of the torus is preferably approximately 2.5 mm wide and the wire most commonly employed is approximately 0.3 mm thick, which is equivalent to a ratio of 10:1. The wires can be reliably threaded through such toruses with a jet of water.

At least one of the closed wire guides in another preferred embodiment of the invention is associated with an open wire guide, especially a wire guide with a notch. The combination of closed and open wire guide is of particular advantage because the open wire guide alone guides the wire when the cut is vertical or at an acute conical angle. It is only when the cut slants conically to a considerable extent, more than 2° for instance, that the torus assumes guidance of the wire. This approach combines, it might be said, the advantages of a wire guide in the form of a torus with those of a open V-groove wire guide without the drawbacks of either. The opening through the center of the torus can be wide enough to readily accommodate the jet.

The unrolling wire in one particularly preferred embodiment of the invention advances along and against an electric-current source and wire tensioner that supplies it with electro-erosive cutting current and stretches it out taut from the vertical it would descend along untensioned, through the open or open V-groove wire guide, past the wire-position sensor, through the closed wire guide, through the workpiece, and through another open or open V-groove wire guide. The wire-position sensor will detect any b bulging on the part of the wire at angles less than 2°(in the vicinity of the notch, that is) and at more obtuse angles it will detect the position of the wire in the torus. Another wire-position sensor can be accommodated downstream of the torus.

Another particularly advantageous version of the invention has in addition to the characteristics recited in the preamble to Claim 1 at least one wire-position sensor and processor that communicates with the computerized controls and conducts tests at the surface of the workpiece. It is in fact possible in accordance with another discovery essential to the invention for the wire-position sensor to rapidly, simply, and precisely sense the wire where it is in contact with the workpiece. All that is necessary is to measure the size of the belly in the vicinity of the workpiece. There is as yet no current in the wire at this point. The processor (one routine therein e.g.) processes the results of measuring the bulge and converts them when they exceed a certain threshold into a pulse that reestablishes the cutting.

Tests are conducted at the surface of the workpiece at the state of the art with a potential of 20 V. A breakdown in the voltage indicates arrival at the workpiece. This procedure will in contrast to that in accordance with the invention, however, not workpiece if there is a layer of non-conductive din on the surface of the workpiece. The invention on the other hand makes it possible for the first time to sense the position of the wire in relation to the workpiece just by monitoring the position of the wire.

The present invention, in summary, makes it unnecessary to replace the wire guides when the wire is replaced with a thicker or thinner wire. The invention helps to eliminate down times. It also increases reliability by facilitating wire threading.

BRIEF DESCRIPTION OF THE DRAWINGS

Further preferred characteristics and advantages of the present invention will be evident from the following specification. The invention will now be specified by way of example in relation to prior art with reference to the drawing, wherein.

DESCRIPTION OF THE PREFERRED EMBODIMENTS

Figure 1:
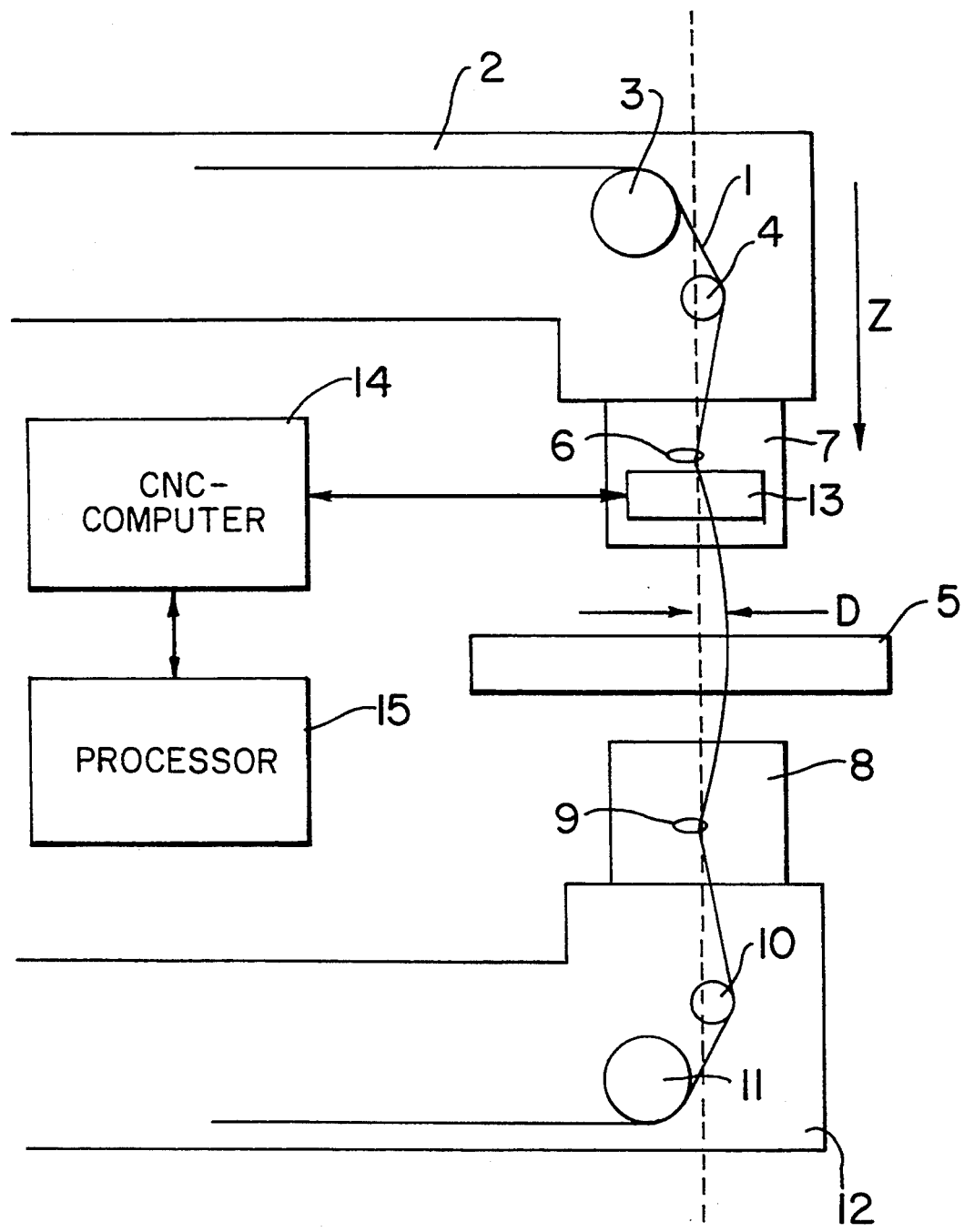
FIG. 1 is a schematic view of one preferred embodiment of the invention.

The terminology employed hereinafter is intended to facilitate comprehension of the present invention without limiting it in any way. The terms "top," "bottom," "narrower," and "wider" in particular are to be understood as referring to apparatus of conventional orientation and size and to conventionally mounted workpiece. The figures are not necessarily to scale.

The figures are strictly schematic, and basic components like flushing systems and generators not essential to the invention as such are not illustrated.

A cathode in the form of a wire 1 supplied with electric pulses for the purpose of electro-erosive cutting is unrolled from an unillustrated supply reel and advanced from "top" to "bottom" in the direction indicated by arrow Z.

After leaving the reel, wire 1 advances around deflection wheels, only one of which, wheel 3, is illustrated, accommodated in an arm 2 at the top of the stand. Downstream of the deflection wheels, wire 1 advances along and against an electro-current source and wire tensioner 4 that, in conjunction with a similar source and tensioner 10 farther downstream, conventionally supplies the wire with electro-erosive cutting pulses from the apparatus' generator and stretches the wire out taut from the vertical (represented by the dotted line) it would descend along untensioned. Downstream of first electric-current source and wire tensioner 4, wire 1 advances through a closed wire guide 6 in the form of a torus (illustrated in perspective) accommodated in an upper wire-guide head 7 that advances in the U-V plane. Downstream of first torus 6 wire 1 advances through workpiece 5 (which moves in the X-Y plane). Downstream of workpiece 5, wire 1 advances through another torus 9 accommodated in a lower wire-guide head 8. Downstream of second torus 9, wire 1 advances along and against second electric-current source and wire tensioner 10. Downstream of second source and tensioner 10, wire 1 advances around another deflection wheel 11 accommodated in another arm 12 at the bottom of the stand. After leaving deflection wheel 11, wire 1 drops into an unillustrated waste-wire receptacle.

Just downstream (or upstream if preferable) of first toms 6 is a wire-position sensor 13. Wire-position sensor 13 communicates with computerized numerical controls 14 that have access to a processor 15 or appropriate software routine.

The dotted lines in the figures represent the vertical that the wire would descend along if it were not tensioned by electric-current sources and wire tensioners 4 and 10. Since the opening through the center of toruses 6 and 9 is wider than the wire is thick, the guides are positioned where the wire descending untensioned would not swing freely at the center of the opening but would be forced against its circumference. Wire-position sensor 13 can now measure the extent to which the wire will belly out. The maximal bulge D of the untensioned wire is typically only a few micrometers. The extent of the belly in the vicinity of workpiece 5 can be calculated from the bulge at the same level as wire-position sensor 13 with first torus 6 as a point of reference. In summary, the precision of the torus, which is not very high, is decisively improved by the use of wire-position sensor 13.

Figure 2:
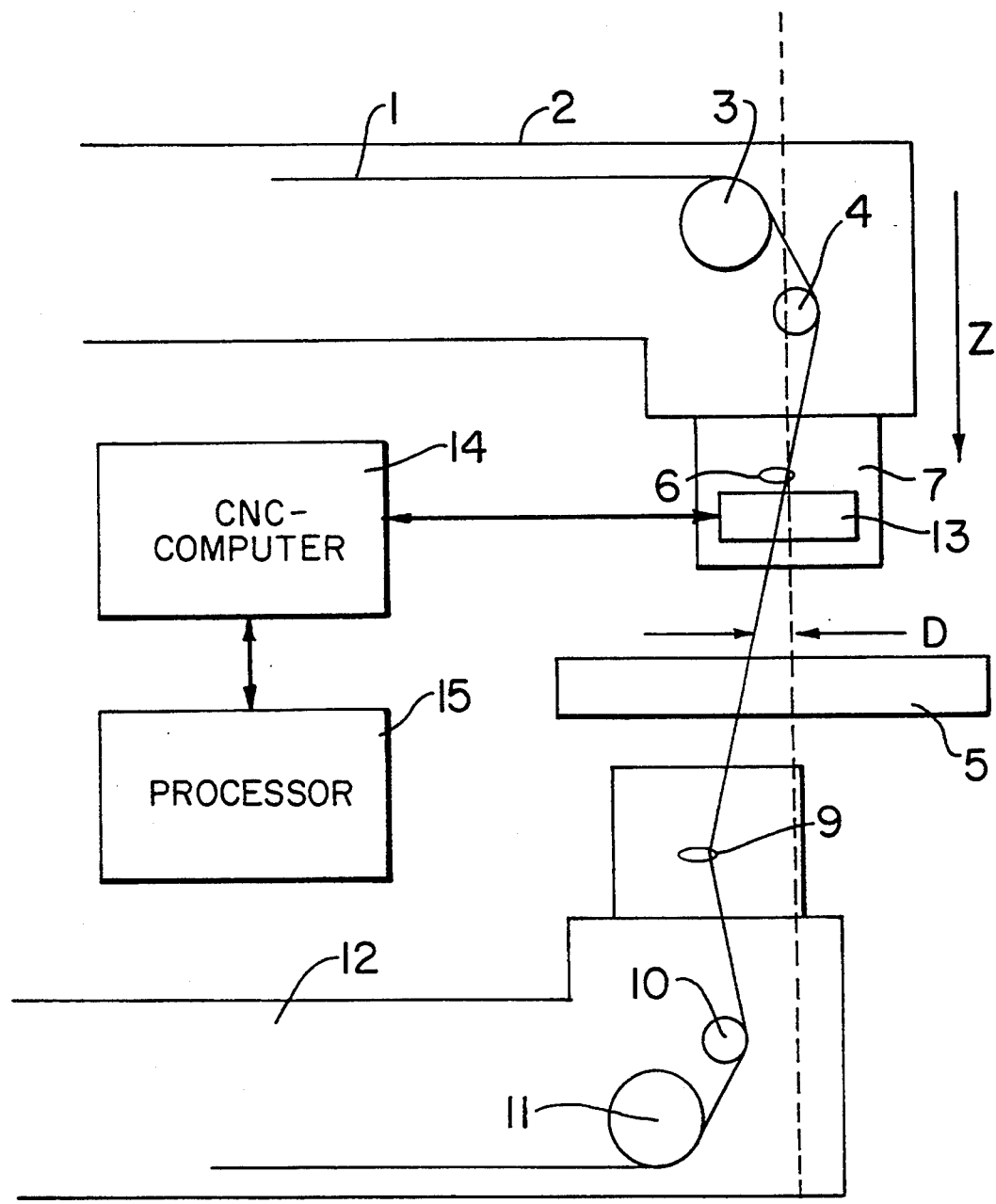
FIG. 2 is a schematic view of the embodiment illustrated in FIG. 1 at another stage of the operation.

FIG. 2 illustrates how a cut is performed at a conical angle by forcing wire 1 to one side of the vertical it would descend along untensioned. The displacement of arms 2 and 12 in relation to each other is illustrated. Wire-position sensor 13 is near enough first toms 6 to precisely measure the position of wire 1 therein. Even though the exact position of wire 1 along the circumference of the opening through the center of toruses 6 and 9 depends on the slope of the wire, the position can still be precisely measured.

Figure 3:
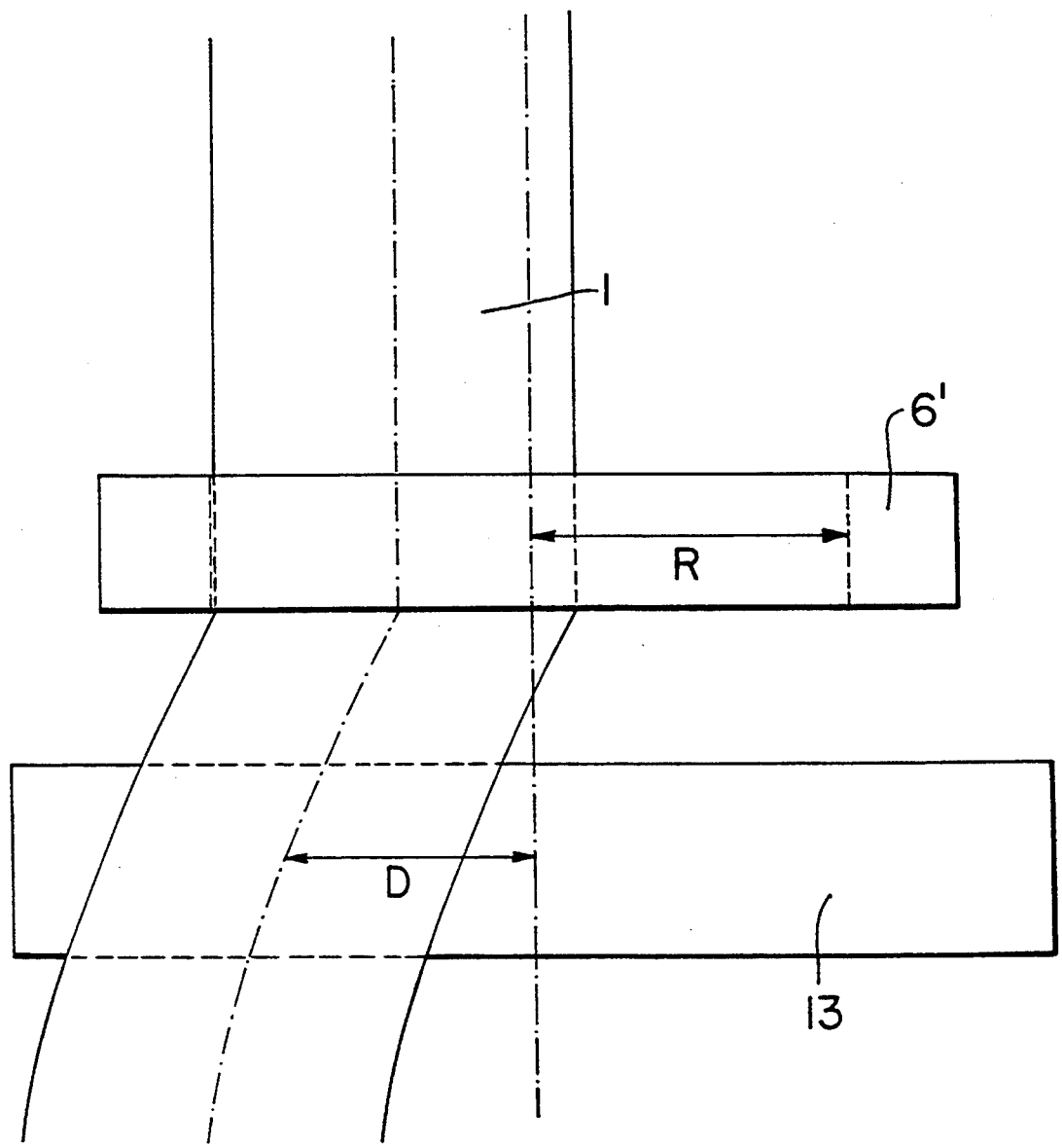
FIG. 3 is a schematic view of the essential components of another embodiment of the invention.

The wire 1 illustrated in the much larger-scale detail in FIG. 3 is only approximately 2/5 thinner than the opening at the center of torus 6' is wide. The opening can for example be 20 μm wide and the wire only 13 μm thick. Nevertheless, it will not be necessary to replace the guide with one that has a opening only a little wider than 13 Measuring the position of the wire even imprecisely will make it possible to calculate its position precisely enough just from how far it deviates from the vertical it would descend along untensioned.

Figure 4:
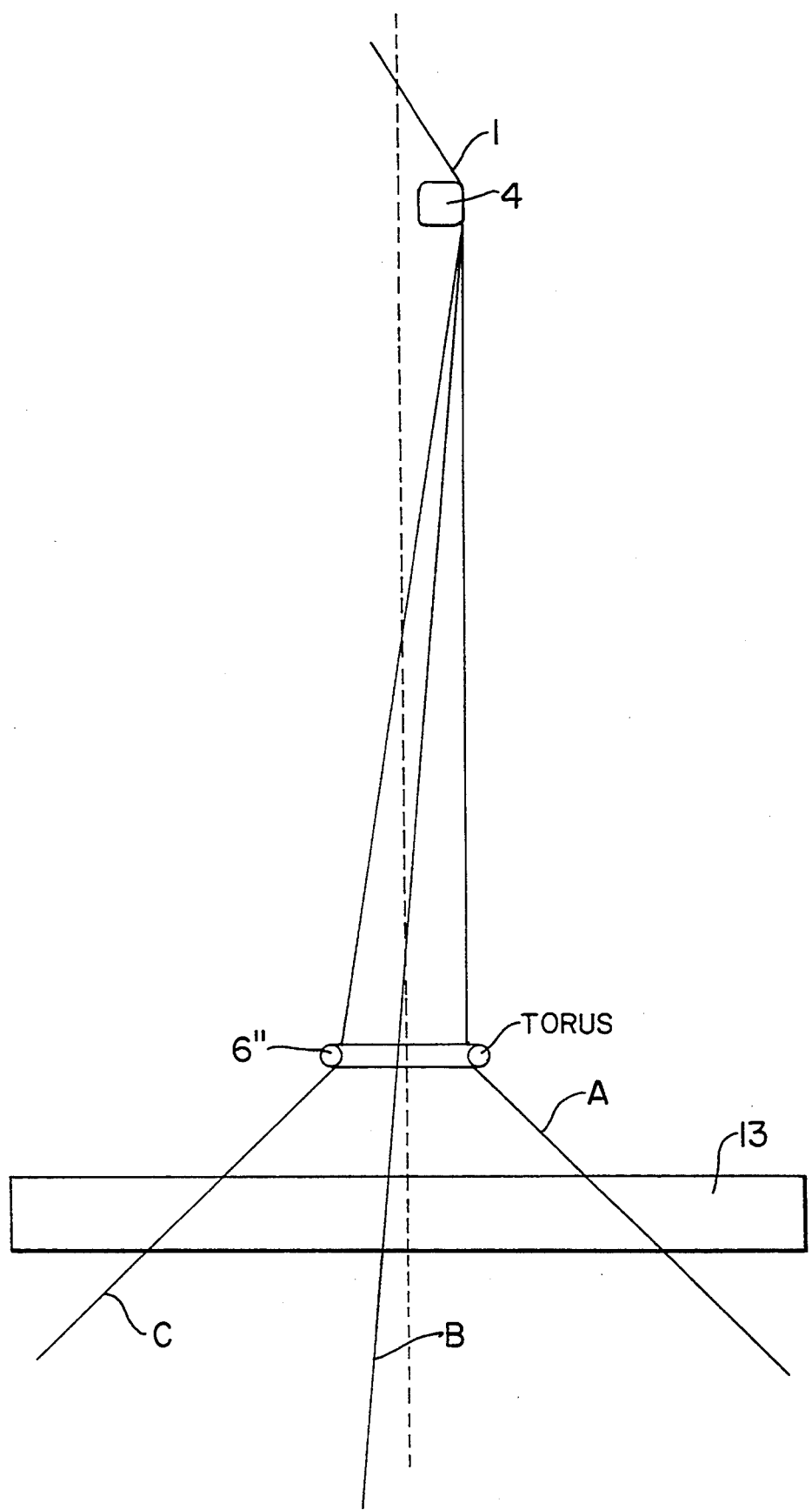
FIG. 4 is a schematic view of the essential components of another embodiment of the invention.

FIG. 4 illustrates another embodiment of the invention, demonstrating that it is even possible for the opening through the center of a torus 6 to be much wider than the wire is thick. While cutting at angles A and C, wire 1 will rest against the circumference of the opening. Wire-position sensor 13 will, however, be able to detect the wire's position while it is cutting at angle B even though it is not resting against the circumference.

Figure 5:
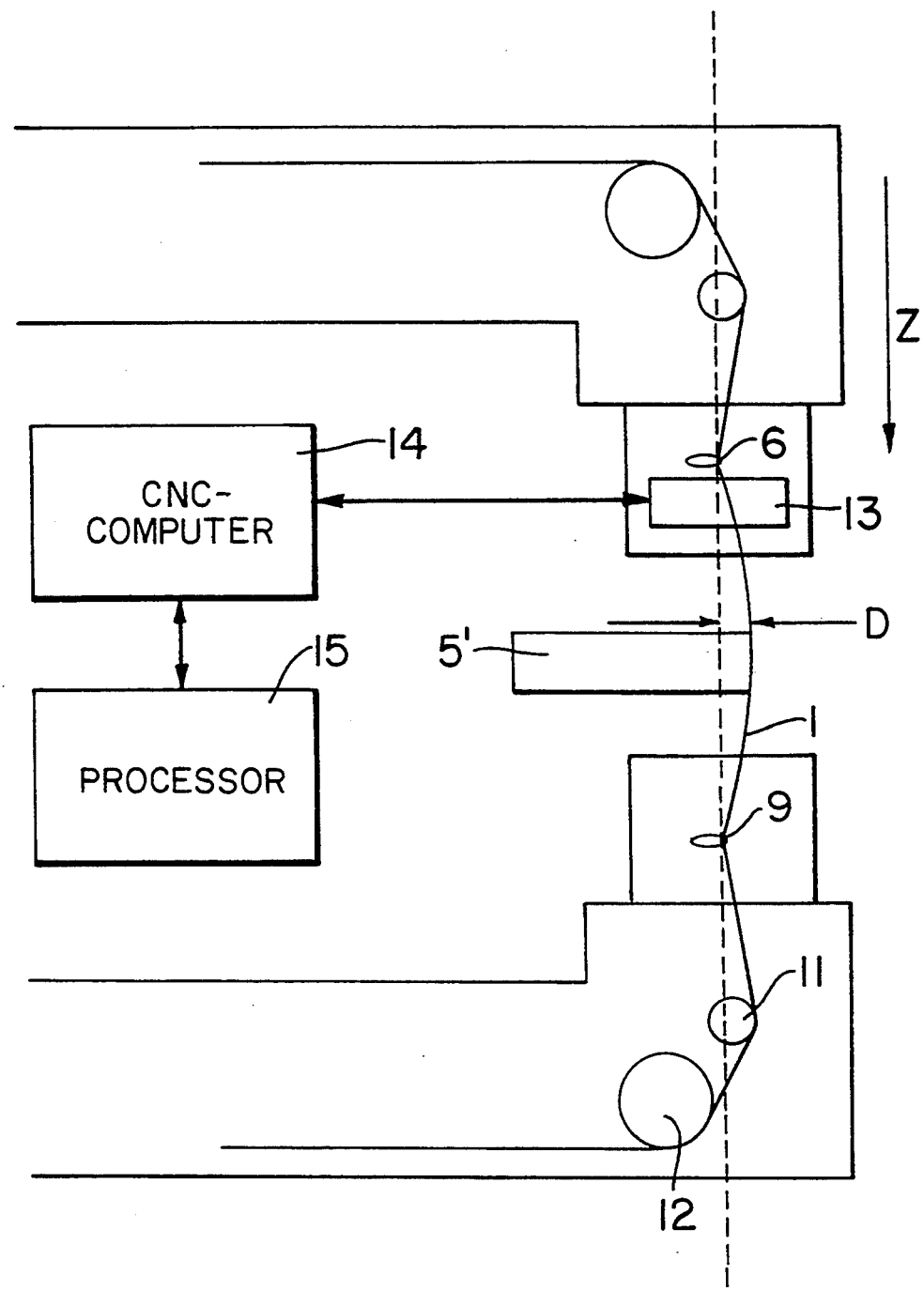
FIG. 5 is a schematic view of the embodiment illustrated in FIG. 1 while sensing is being carried out at the workpiece.

FIG. 5 illustrates testing at the surface of a workpiece 5'. Wire-position sensor 13 can easily monitor wire 1 rapidly and precisely at the surface of the workpiece while the blank is being cut out. The workpiece is advanced in the X-Y plane against wire 1. Contact produces a belly D in terms of the vertical that wire 1 would descend along untensioned. Processor 15 comes into action once the bulge has attained 3 μm and reliably conducts the test. Even layers of din on the surface have no effect. Such wire-position sensor testing is of course not limited to toruses and can also be employed with open guides.

Figure 6:
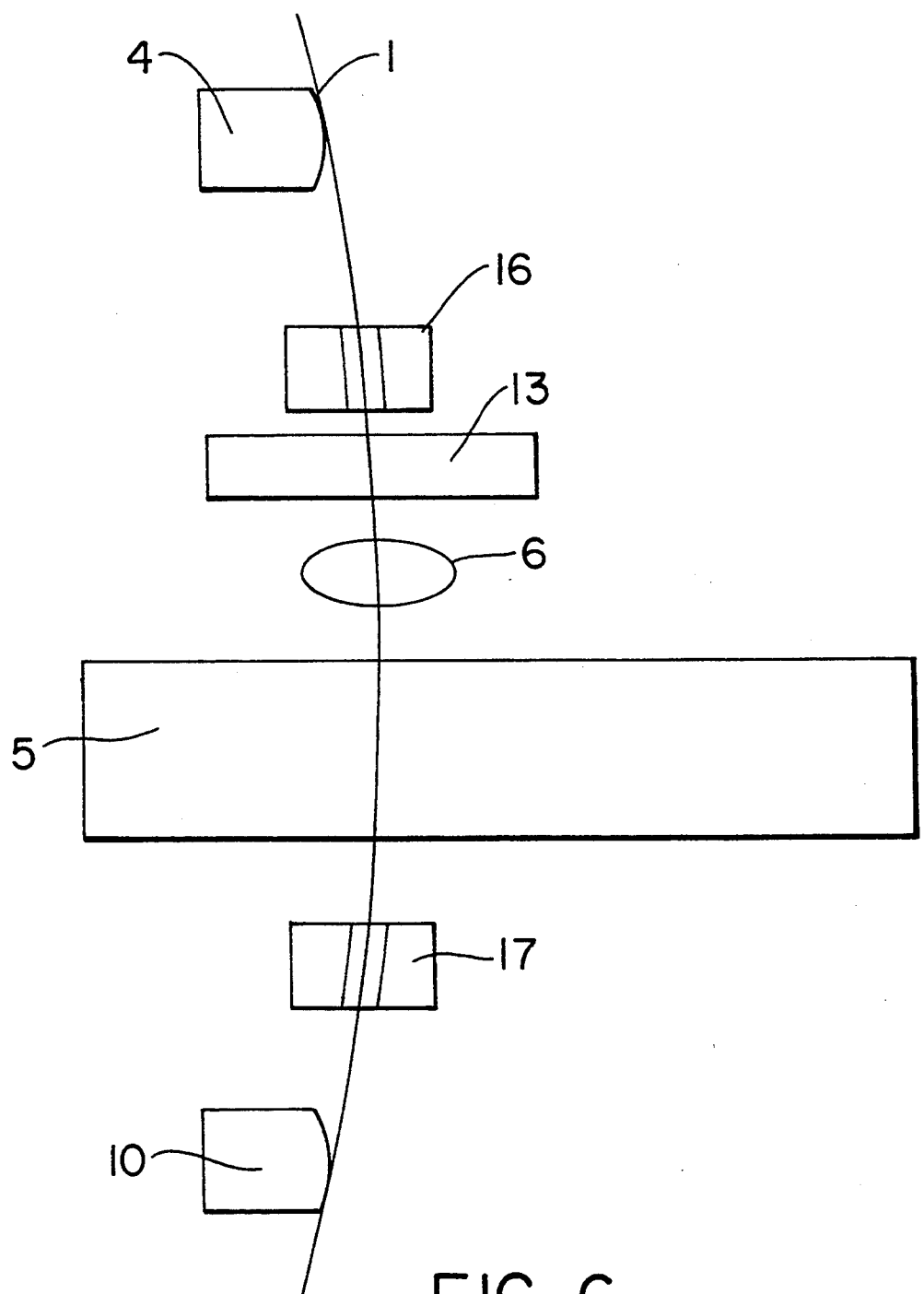
FIG. 6 illustrates another embodiment of the invention.

FIG. 6 illustrates an embodiment of the invention wherein first closed wire guide 6 in the form of a toms is associated with an open or open V-groove wire guide 16. Wire position sensor 13, which is downstream of open wire guide 16, will measure the belly as long as the cut is being cut at an angle of less than 2° to the vertical that wire 1 would descend along untensioned. Torus 6 will begin to guide the wire once the angle is greater than 2° Since wire-position sensor 13 is in this event upstream of wire guide 6, the sensor will be able to precisely detect the position of wire 1 in the guide. The bulge can then be measured by another wire-position sensor for example, or else there will be no bulge measurement at all once the angle is greater than 2°. Instead of a closed wire guide downstream of workpiece 5 in this embodiment, there is another open or open V-groove wire guide 17, which can to advantage however be associated with another closed wire guide. This version of the invention is conveniently designed to ensure that any "conically sloping" tension applied to wire 1 by electric-current sources and wire tensioners 4 and 10 will be powerful enough to secure the wire in open wire guide 16 until the wire slants at enough of an angle to rest against the inside of the closed wire guide. It is also of advantage to match the wire tension, the width of the opening at the center of the closed wire guide, and sometimes the thickness of the wire as well to the overall design with respect to distances between components.

We claim:

1. An apparatus for electro-erosive cutting, comprising a wire cathode advancing through a wire guide located upstream of the workpiece in terms of the direction advanced by the wire, said wire guide is a closed or surrounding wire guide and shaped like a torus, and a wire-position sensor located such as to monitor the position of the wire in the torus-shaped guide.

2. The apparatus of claim 1, further comprising a water jet wire threader.

3. The apparatus of claim 1, wherein the closed, torus-shaped wire guide has an opening through the center which is at least twice as wide as the wire is thick.

4. The apparatus of claim 3 wherein the opening through the center of the closed, torus-shaped wire guide is approximately 10 times wider than the wire is thick.

5. The apparatus of claim 1, further comprising an open V-grooved wire guide located upstream.

6. The apparatus of claim 1, further comprising a processor connected to the wire position sensor which communicates with a computerized control the touching of the surface of the workpiece by the wire.

7. A method for electro-erosive cutting with a wire cathode, comprising the steps of
   guiding the wire through a closed torus shaped wire guide,
   monitoring the position of the wire with a wire-position sensor, and
   processing the results of the position monitoring for determining the position of the wire in the wire guide.

8. The method of claim 7, wherein the determining of the wire position at the workpiece is conducted solely on the basis of measurements of the position of the wire.

9. A method for electro-erosive cutting, comprising the steps of
   advancing a wire cathode along and against an electric-current source, whereby a tension is asserted on the wire,
   advancing the wire through a first open V-grooved wire guide,
   advancing the wire along a wire-position sensor,
   advancing the wire through a closed torus-shaped wire guide,
   monitoring the position of the wire with the wire-position sensor,
   processing the results of the position monitoring by determining the position of the wire in the closed wire guide,
   advancing the wire through the workpiece, and
   advancing the wire through a second open V-groove wire guide.

* * * * *